United States Patent [19]

Miller

[11] Patent Number: 5,139,647

[45] Date of Patent: Aug. 18, 1992

[54] PROCESS FOR PREPARING LOW POUR MIDDLE DISTILLATES AND LUBE OIL USING A CATALYST CONTAINING A SILICOALUMINOPHOSPHATE MOLECULAR SIEVE

[75] Inventor: Stephen J. Miller, San Francisco, Calif.

[73] Assignee: Chevron Research and Technology Company, San Francisco, Calif.

[21] Appl. No.: 392,907

[22] Filed: Aug. 14, 1989

[51] Int. Cl.$^5$ .............................................. C10G 11/04
[52] U.S. Cl. ..................................... 208/100; 208/102; 208/114; 208/111; 208/18; 208/97; 585/739
[58] Field of Search .................... 208/14, 18, 111, 114, 208/108, 97, 100, 102; 585/739

[56] References Cited

U.S. PATENT DOCUMENTS

| | | | |
|---|---|---|---|
| RE. 28,398 | 4/1978 | Chen et al. | 208/111 |
| 3,506,565 | 4/1970 | White | 208/59 |
| 3,530,061 | 9/1970 | Orkin et al. | 208/60 |
| 3,637,483 | 1/1972 | Carey | 208/86 |
| 3,755,145 | 8/1973 | Orkin | 208/111 |
| 3,758,402 | 9/1973 | Oleck et al. | 208/111 |
| 3,790,472 | 2/1974 | White | 208/111 |
| 3,852,207 | 12/1974 | Strangeland et al. | 208/58 |
| 3,853,742 | 12/1974 | Ward | 208/111 |
| 4,162,962 | 7/1979 | Strangeland | 208/18 |
| 4,283,272 | 8/1981 | Garwood et al. | 208/59 |
| 4,325,805 | 4/1982 | Mayer et al. | 208/58 |
| 4,414,097 | 11/1983 | Chester et al. | 208/59 |
| 4,486,296 | 12/1984 | Oleck et al. | 208/111 |
| 4,683,050 | 7/1987 | Ward | 208/111 |
| 4,689,138 | 8/1987 | Miller | 208/114 |
| 4,724,066 | 2/1988 | Kerker et al. | 208/114 |
| 4,765,884 | 8/1988 | Walker et al. | 208/114 |
| 4,814,316 | 3/1989 | Pellet et al. | 208/114 |
| 4,842,714 | 6/1984 | Pellet et al. | 208/114 |
| 4,859,312 | 8/1989 | Miller | 208/111 |
| 4,913,798 | 4/1990 | Gortsema et al. | 208/112 |

FOREIGN PATENT DOCUMENTS

| | | |
|---|---|---|
| 0225053 | 6/1987 | European Pat. Off. . |
| 8603694 | 7/1986 | PCT Int'l Appl. . |
| WO88/05070 | 7/1988 | PCT Int'l Appl. . |

*Primary Examiner*—Helane Myers
*Attorney, Agent, or Firm*—Burns, Doane, Swecker & Mathis

[57] ABSTRACT

The present invention relates to a hydrocracking and isomerization process for preparing low pour point middle distillate hydrocarbons and lube oil from a hydrocarbonaceous feedstock boiling above about 600° F. by contacting the feedstock with a catalyst containing an intermediate pore size silicoaluminophosphate molecular sieve and a hydrogenation component.

28 Claims, 3 Drawing Sheets

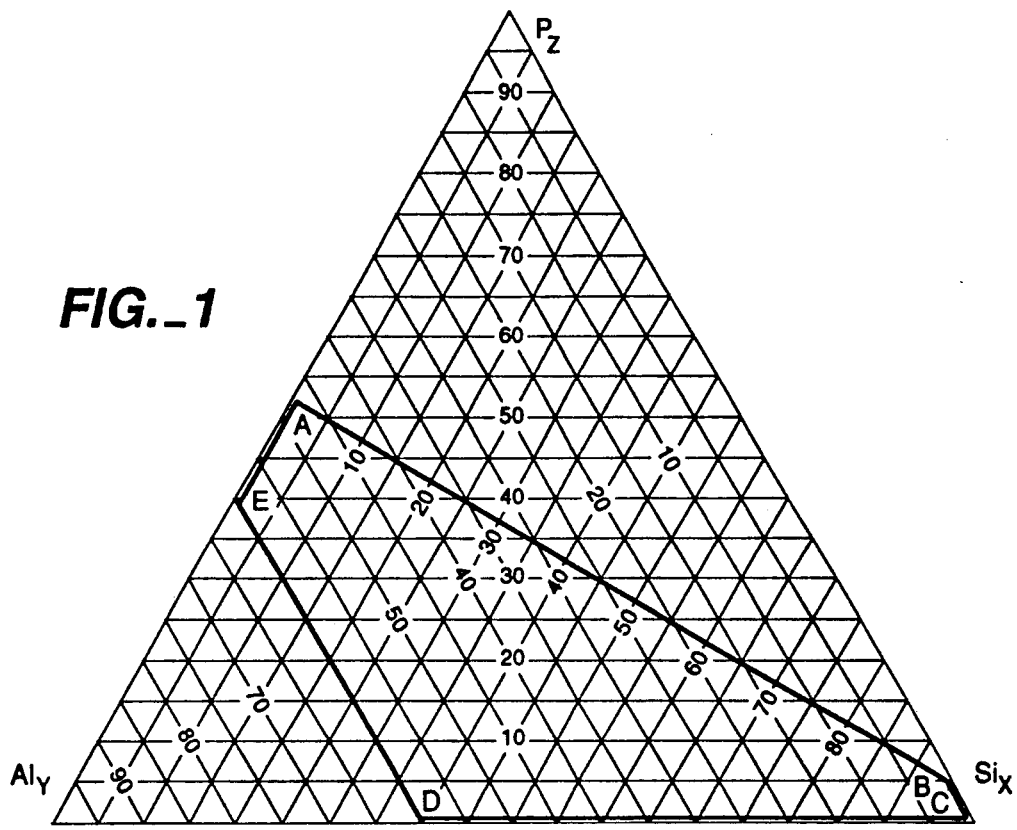
FIG._1
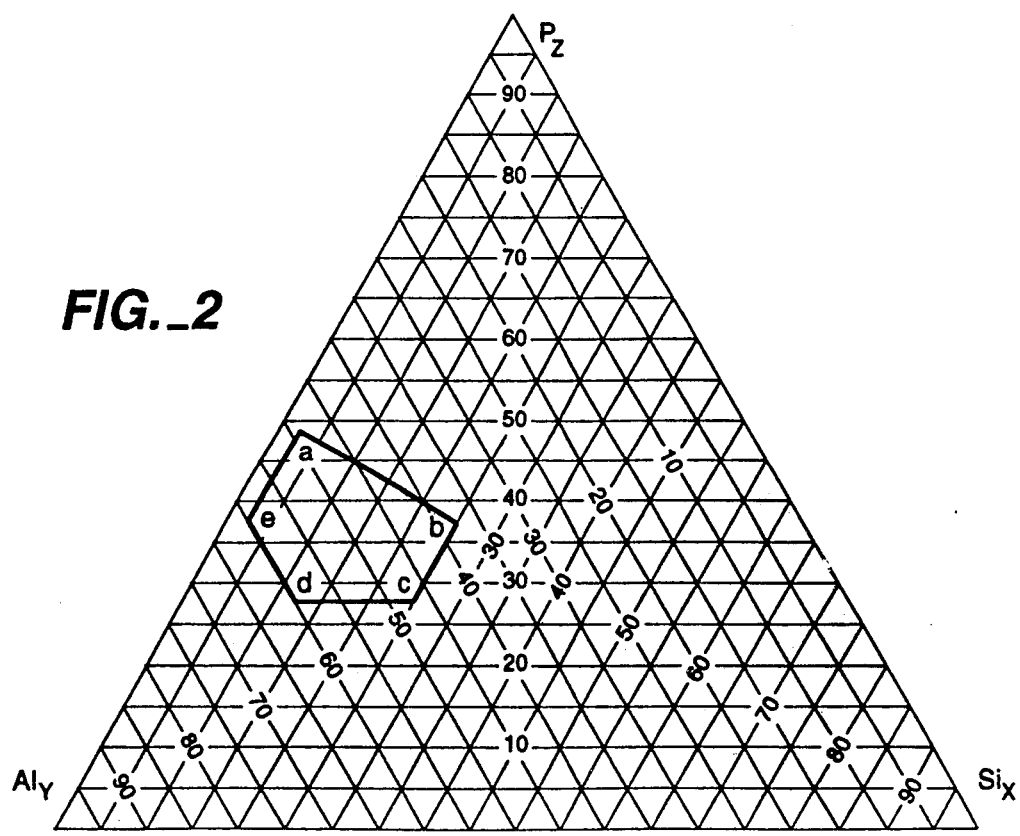
FIG._2

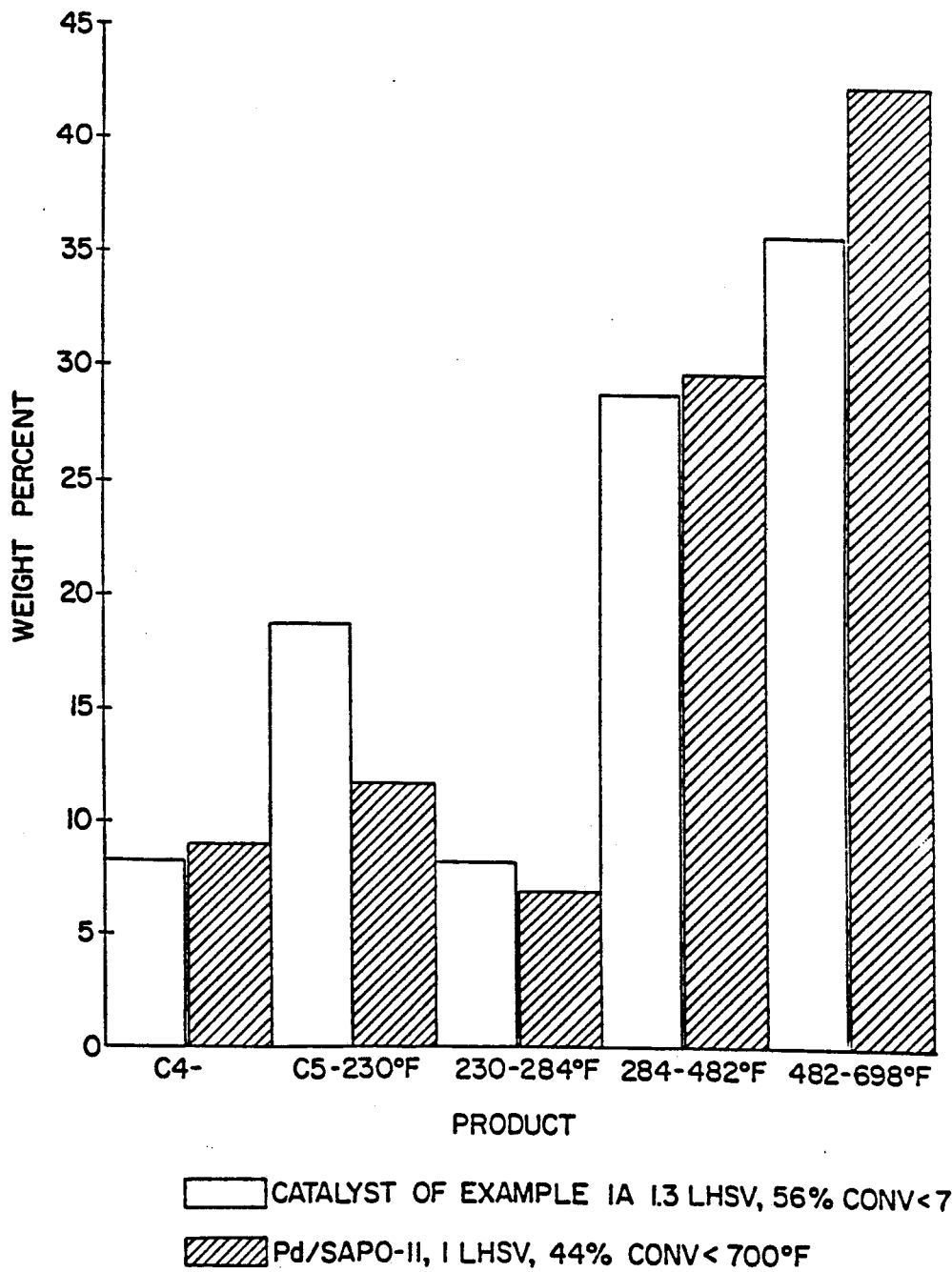
FIG._3.

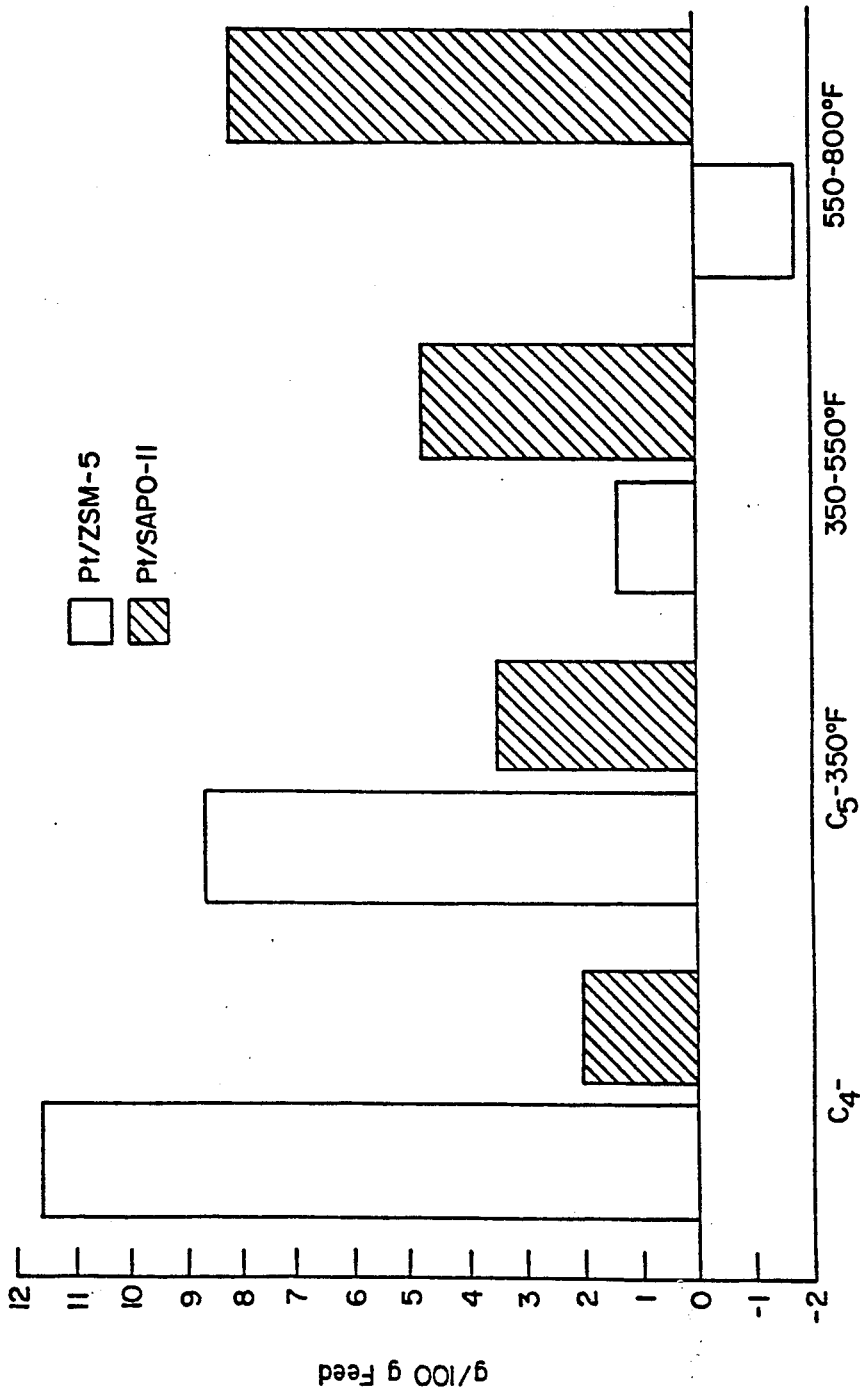

PROCESS FOR PREPARING LOW POUR MIDDLE DISTILLATES AND LUBE OIL USING A CATALYST CONTAINING A SILICOALUMINOPHOSPHATE MOLECULAR SIEVE

BACKGROUND OF THE INVENTION

The present invention relates to a process for preparing low pour point middle distillate hydrocarbons and lube oil. More specifically, the invention relates to a hydrocracking and isomerization process for selectively preparing low pour point middle distillate hydrocarbons and lube oil from a hydrocarbonaceous feedstock boiling above about 600.F by contacting the feedstock with a catalyst comprising an intermediate pore size silicoaluminophosphate molecular sieve and a hydrogenation component.

DESCRIPTION OF THE PRIOR ART

Hydrocracking, used either in a one-step process or in a multi-step process coupled with hydrodenitrogenation and/or hydrodesulfurization steps, has been used extensively to upgrade poor-quality feeds and produce middle distillate materials. Over the years, much work has been done to develop improved cracking conditions and catalysts. Tests have been carried out using catalysts containing only amorphous materials and catalysts containing zeolites composited with amorphous materials.

Large pore size zeolites such as zeolites X and Y are presently considered the most active hydrocracking catalysts. However, high activity is not the only essential characteristic of midbarrel cracking in catalysts. Midbarrel selectivity, namely, the percentage of total conversion accounted for by products boiling within the midbarrel range of from about 300° F. to about 725° F. is also important. As noted in U.S. Pat. No. 3,853,742, many commercial midbarrel hydrocracking processes do not use zeolitic catalysts due to their relatively low midbarrel selectivity.

Also, middle distillates conventionally serve as fuels such as diesel oils, jet fuels, furnace oils, and the like. For convenience in the handling and use of these middle distillates, it is desirable for the pour point to be as low as practical consistent with the temperatures to which they may be exposed. Specifications for these products often include a requirement that the pour point or freeze point not exceed a certain maximum value. In some instances, it is necessary to subject these distillate fuels to additional processing, the principle purpose of which is to reduce the pour point of the feed stream. Pour point can also be lowered by lowering the distillate end point, however this reduces yield.

As noted in U.S. Pat. No. 4,486,296, although zeolite catalysts have been employed in hydrocracking processes and may be effective in providing distillate yields having one or more properties consistent with the intended use of the distillate, these catalysts suffer the disadvantage of providing product yields that do not have good low temperature fluidity characteristics, particularly reduced pour point and viscosity.

The prior art has utilized a separate dewaxing process to reduce the pour point of middle distillates wherein selective intermediate pore size zeolites such as ZSM-5 (U.S. Pat. No. RE. 28,398), and ZSM-23 (European Patent Application No. 0092376) are employed.

Other methods in the art for producing middle distillates possessing acceptable viscosity and pour point properties include processes wherein the hydrocarbon feeds are concurrently or sequentially subjected to hydrocracking and dewaxing in a continuous process using a large pore size zeolite hydrocarbon cracking catalyst such as zeolite X or zeolite Y and an intermediate pore size zeolite dewaxing catalyst such as ZSM-5 (U.S. Pat. No. 3,758,402).

These processes have two drawbacks. The first is that while the pour point is reduced, the viscosity is increased, possibly above acceptable limits. The second drawback is that the process operates by cracking wax primarily to light products (e.g., $C_3$–$C_4$) thereby significantly reducing distillate yield. PCT International Application WO86/03694 discloses a hydrocracking process to produce high octane gasoline using a catalyst comprising silicoaluminophosphates, either alone or in combination with traditional hydrocracking catalysts such as zeolite aluminosilicates.

As set forth in co-pending application Ser. No. 07/002,087, now U.S. Pat. No. 4,859,312 applicant has discovered that middle distillate products can be selectively produced in a simplified process over a single catalyst in high yields which exhibit reduced pour points and viscosities as compared to prior art processes. Applicant has found that heavy hydrocarbon oils may be simultaneously hydrocracked and hydrodewaxed to produce a midbarrel liquid product of improved yield and satisfactory pour point and viscosity by using a catalyst containing an intermediate pore size silicoaluminophosphate molecular sieve component and a hydrogenation component to promote isomerization.

High-quality lubricating oils are critical for the machinery of modern society. Unfortunately, the supply of natural crude oils having good lubricating properties, e.g., Pennsylvania and Arabian Light feedstocks, is not enough to meet present demands. Additionally, because of uncertainties in world crude oil supplies, it is necessary to be able to produce lubricating oils efficiently from ordinary crude feedstocks.

Numerous processes have been proposed to produce lubricating oils by upgrading the ordinary and low-quality stocks which ordinarily would be converted into other products.

The desirability of upgrading a crude fraction normally considered unsuitable for lubricant manufacture into one from which good yields of lube oils can be obtained has long been recognized. Hydrocracking processes have been proposed to accomplish such upgrading. U.S. Pat. Nos. 3,506,565, 3,637,483 and 3,790,472 teach hydrocracking processes for producing lubricating oils.

Hydrocracked lubricating oils generally have an unacceptably high pour point and require dewaxing. The bottoms from distilling the hydrocracked product are generally recycled back to the hydrocracker for further conversion to lower boiling products. It would be of utility if the hydrocracking process produced a distillation bottoms fraction of low pour point and high viscosity index which could therefore be used as a lube oil.

Solvent dewaxing is a well-known and effective process but is expensive. More recently, catalytic methods for dewaxing have been proposed. U.S. Pat. No. Re. 28,398 discloses dewaxing petroleum charge stocks using ZSM-5 type zeolites. U.S. Pat. No. 3,755,145 discloses a process for preparing low pour point lube oils by hydrocracking a lube oil stock using a catalyst mixture comprising a conventional cracking catalyst and ZSM-5.

It has also been suggested that in order to improve the oxidation resistance of lubricants it is often necessary to hydrogenate or hydrofinish the oil after hydrocracking, with and without catalytic dewaxing as illustrated in U.S. Pat. Nos. 4,325,805; 4,347,121; 4,162,962; 3,530,061; and 3,852,207. U.S. Pat. Nos. 4,283,272 and 4,441,097 teach continuous processes for producing dewaxed lubricating oil base stocks including hydrocracking a hydrocarbon feedstock, catalytically dewaxing the hydrocrackate and hydrofinishing the dewaxed hydrocrackate. These patents teach the use of catalysts comprising zeolite ZSM-5 and ZSM-23, respectively, for the dewaxing phase.

European Patent Application No. 225,053 discloses a process for producing lubricant oils of low pour point and high viscosity index by partially dewaxing a lubricant base stock by isomerization using a large pore, high silica zeolite dewaxing catalyst followed by a selective dewaxing step.

The prior art does not provide a process whereby both low pour mid-distillate hydrocarbons and lube oil can be prepared in the same reactor.

Generally, the high boiling bottoms from distilling the hydrocracked product are high in pour point and therefore are of limited value without further processing. These bottoms therefore are generally recycled back to the hydrocracker for further conversion to lower boiling products. It would be of utility if the hydrocracking process were to produce a distillation bottoms fraction of low pour point and high viscosity index which could therefore be used as a lube oil.

SUMMARY OF THE INVENTION

The present invention overcomes the disadvantages of the prior art by providing a process for simultaneously preparing low pour and freeze point mid-distillate hydrocarbons and low pour point lube oil base stock in the same reactor.

It is an object of the invention to provide a process for preparing both low pour mid-distillates and lube oil base stock wherein the amount of bottoms recycled is reduced or eliminated thereby providing increased throughput.

It is a further object of the invention to provide a process for producing low pour middle distillate hydrocarbons and low pour, high viscosity index lube oil in the same reactor.

Additional objects and advantages of the invention will be set forth in part in the description which follows, and in part will be obvious from the description or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a process for selectively preparing low pour middle distillate hydrocarbons and low pour, high viscosity index, low viscosity lube oil comprising (a) contacting under hydrocracking conditions a hydrocarbonaceous feed wherein at least about 90% of said feed has a boiling point greater than about 600° F., with a catalyst comprising an intermediate pore size silicoaluminophosphate molecular sieve and at least one hydrogenation component; (b) recovering a hydrocarbonaceous effluent wherein greater than about 40% by volume of said effluent (1) boils above 300° F. and below from about 675° F. to about 725° F. (2) and has a pour point below about 0° F.; and (c) distilling the hydrocarbonaceous effluent to produce a first fraction containing middle distillate products having a boiling point below from about 675° F. to about 725° F., and a second fraction containing a lube oil having a boiling point above about 700° F.

In the process of the invention, the hydrocarbon feedstock is contacted with the intermediate pore size silicoaluminophosphate molecular sieve catalyst under conversion conditions appropriate for hydrocracking. During conversion, the aromatics and naphthenes present in the feedstock undergo hydrocracking reactions such as dealkylation, ring opening, and cracking, followed by hydrogenation. The long-chain paraffins present in the feedstock undergo mild cracking reactions to yield non-waxy products of higher molecular weight than products obtained using prior art dewaxing zeolitic catalysts such as ZSM-5. At the same time, a measure of isomerization occurs so that not only is the pour point reduced by the cracking reactions described above, but in addition, the n-paraffins become isomerized to isoparaffins to form liquid-range materials which contribute to low viscosity, low pour point products. In the bottoms portion of the effluent, a measure of hydrocracking and isomerization takes place which contributes not only to the low pour point and viscosity of the lube oil base stock but also to its high viscosity index, since isoparaffins are known to have high viscosity indices.

The process of the invention enables heavy feedstock, such as gas oils, boiling above about 600° F. to be more selectively converted to middle distillate range products having improved pour points than prior art processes using large pore catalysts, such as zeolite Y. Further, in the process of the invention, the consumption of hydrogen will be reduced even though the product will conform to the desired specifications for pour point and viscosity. Further, the process of the invention provides bottoms having a low pour point, low viscosity and high viscosity index which are suitable for use as lube oil.

In comparison with prior art dewaxing processes using shape selective catalysts such as zeolite ZSM-5, the yields of the process of the invention will be improved and the viscosity kept acceptably low. The latter is ensured because the bulk conversion involves not only the cracking of low viscosity paraffins but high viscosity components (e.g., multi-ring naphthenes) as well. In addition, unlike the prior art ZSM-5 catalyst, the process of the invention provides low pour point middle distillates and high viscosity index lube oil base stock due to a measure of isomerization which produces isoparaffins which contribute not only to the low pour point and viscosity, but also to the high viscosity index in the bottoms. Thus, the present process is capable of effecting bulk conversion together with simultaneous dewaxing. It is also possible to operate at partial conversion, thus effecting economies in hydrogen consumption while still meeting pour point and viscosity requirements. Overall, the present process reduces or eliminates the amount of bottoms recycled, thereby increasing throughput.

The accompanying drawings, which are incorporated in and constitute a part of this specification illustrate several exemplary embodiments of this invention and together with the description, serve to explain the principles of the invention.

BRIEF DESCRIPTION OF THE DRAWINGS

FIG. 1 is a ternary diagram showing the compositional parameters of the silicoaluminophosphates of U.S. Pat. No. 4,440,871 in terms of mole fractions of silicon, aluminum, and phosphorus.

FIG. 2 is a ternary diagram showing the preferred compositional parameters of the silicoaluminophosphates in terms of mole fractions of silicon, aluminum, and phosphorus.

FIG. 3 is a graph showing a comparison for a crystalline silicoaluminophosphate catalyst used in the process of this invention and a sulfided cogelled nickel-tungsten-silica-alumina catalyst with respect to yields.

FIG. 4 is a graph showing a comparison for a crystalline silicoaluminophosphate catalyst used in the process of this invention and a ZSM-5 catalyst with respect to yields.

DESCRIPTION OF THE PREFERRED EMBODIMENTS

Reference will now be made in detail to the preferred embodiments of applicant's invention.

Feedstocks

The feedstock for the process of the invention comprises a heavy hydrocarbon oil such as a gas oil, coker tower bottoms fraction, reduced crude, vacuum tower bottoms, deasphalted vacuum resids, FCC tower bottoms, or cycle oils. Oils of this kind generally boil above about 600° F. (316° C.) although the process is also useful with oils which have initial boiling points as low as 436° F. (260° C.). Preferably, at least 90% of the feed will boil above 600° F. (316° C.). Most preferably, at least about 90% of the feed will boil between 700° F. (371° C.) and about 1200° F. (649° C.). These heavy oils comprise high molecular weight long-chain paraffins and high molecular weight ring compounds with a large proportion of fused ring compounds. During processing, both the fused ring aromatics and naphthenes and paraffinic compounds are cracked by an intermediate pore size silicoaluminophosphate molecular sieve catalyst to middle distillate range products. A substantial fraction of the paraffinic components of the initial feedstock also undergo conversion to isoparaffins.

The process is of particular utility with highly paraffinic feeds because with such feeds, the greatest improvement in pour point may be obtained. The degree of paraffinicity will depend to some degree on the viscosity index desired in the product. For example, when the paraffinic content is greater than about 50% by weight, a viscosity index of at least about 130 can be obtained. The higher the paraffinic content, the higher the viscosity index. Preferably, the paraffinic content of the feed employed is greater than about 20% by weight, more preferably greater than about 40% by weight. The most preferable paraffinic content of the feed will be determined by the viscosity index requirements of the product.

The feedstocks employed in the process of the present invention may be subjected to a hydrofining and/or hydrogenation treatment, which may be accompanied by some hydrocracking, prior to use in the present process.

Silicoaluminophosphate Molecular Sieve Catalysts

As set forth above, the process of the invention combines elements of hydrocracking and isomerization. The catalyst employed in the process has an acidic component and a hydrogenation component. The acidic component comprises an intermediate pore size silicoaluminophosphate molecular sieve which is described in U.S. Pat. No. 4,440,871, the pertinent disclosure of which is incorporated herein by reference.

Among other factors, the present invention is based on my discovery that the use of a catalyst containing a silicoaluminophosphate intermediate pore size molecular sieve and a Group VIII metal in a hydrocracking and isomerization reaction of hydrocarbonaceous feeds boiling above about 600° F. results in unexpectedly high yields of middle distillates and lube oil base stock having excellent pour point characteristics.

The most preferred intermediate pore size silicoaluminophosphate molecular sieve for use in the process of the invention is SAPO-11. When combined with a hydrogenation component, the SAPO-11 produces a midbarrel liquid product and a lube oil base stock of improved yields and satisfactory pour point and viscosity.

SAPO-11 comprises a silicoaluminophosphate material having a three-dimensional microporous crystal framework structure of [$PO_2$], [$AlO_2$] and [$SiO_2$] tetrahedral units whose unit empirical formula on an anhydrous basis is:

$$mR:(Si_xAl_yP_z)O_2 \qquad (I)$$

wherein "R" represents at least one organic templating agent present in the intracrystalline pore system; "m" represents the moles of "R" present per mole of ($Si_xAl_yP_z$)$O_2$ and has a value of from zero to about 0.3, "x", "y" and "z" represent respectively, the mole fractions of silicon, aluminum and phosphorus, said mole fractions being within the compositional area bounded by points A, B, C, D and E on the ternary diagram of FIG. 1 or preferably within the area bounded by points a, b, c, d and e on the ternary diagram of FIG. 2. The silicoaluminophosphate molecular sieve has a characteristic X-ray powder diffraction pattern which contains at least the d-spacings (as-synthesized and calcined) set forth below in Table I. When SAPO-11 is in the as-synthesized form, "m" preferably has a value of from 0.02 to 0.3.

TABLE I

| 2θ | d | Relative Intensity |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m–s |

All of the as-synthesized SAPO-11 compositions for which X-ray powder diffraction data have been obtained to date have patterns which are within the generalized pattern of Table II below.

TABLE II

| 2θ | d | 100 × I/I$_o$ |
|---|---|---|
| 8.05–8.3 | 10.98–10.65 | 20–42 |
| 9.4–9.65 | 9.41–9.17 | 36–58 |

TABLE II-continued

| 2θ | d | 100 × I/I₀ |
|---|---|---|
| 13.1–13.4 | 6.76–6.61 | 12–16 |
| 15.6–15.85 | 5.68–5.59 | 23–38 |
| 16.2–16.4 | 5.47–5.40 | 3–5 |
| 18.95–19.2 | 4.68–4.62 | 5–6 |
| 20.3–20.6 | 4.37–4.31 | 36–49 |
| 21.0–21.3 | 4.23–4.17 | 100 |
| 22.1–22.35 | 4.02–3.99 | 47–59 |
| 22.5–22.9 (doublet) | 3.95–3.92 | 55–60 |
| 23.15–23.35 | 3.84–3.81 | 64–74 |
| 24.5–24.9 (doublet) | 3.63–3.58 | 7–10 |
| 26.4–26.8 (doublet) | 3.38–3.33 | 11–19 |
| 27.2–27.3 | 3.28–3.27 | 0–1 |
| 28.3–28.5 (shoulder) | 3.15–3.13 | 11–17 |
| 28.6–28.85 | 3.121–3.094 | |
| 29.0–29.2 | 3.079–3.058 | 0–3 |
| 29.45–29.65 | 3.033–3.013 | 5–7 |
| 31.45–31.7 | 2.846–2.823 | 7–9 |
| 32.8–33.1 | 2.730–2.706 | 11–14 |
| 34.1–34.4 | 2.629–2.607 | 7–9 |
| 35.7–36.0 | 2.515–2.495 | 0–3 |
| 36.3–36.7 | 2.475–2.449 | 3–4 |
| 37.5–38.0 (doublet) | 2.398–2.368 | 10–13 |
| 39.3–39.55 | 2.292–2.279 | 2–3 |
| 40.3 | 2.238 | 0–2 |
| 42.2–42.4 | 2.141–2.132 | 0–2 |
| 42.8–43.1 | 2.113–2.099 | 3–6 |
| 44.8–45.2 (doublet) | 2.023–2.006 | 3–5 |
| 45.9–46.1 | 1.977–1.969 | 0–2 |
| 46.8–47.1 | 1.941–1.929 | 0–1 |
| 48.7–49.0 | 1.870–1.859 | 2–3 |
| 50.5–50.8 | 1.807–1.797 | 3–4 |
| 54.6–54.8 | 1.681–1.675 | 2–3 |
| 55.4–55.7 | 1.658–1.650 | 0–2 |

Another intermediate pore size silicoaluminophosphate molecular siever preferably employed in the process of this invention is SAPO-31. SAPO-31 comprises a silicoaluminophosphate material having a three-dimensional microporous crystal framework of [PO₂], [AlO₂] and [SiO₂] tetrahedral units whose unit empirical formula on an anhydrous basis is:

wherein R represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorus, said mole fractions being within the compositional area bounded by points A, B, C, D and E on the ternary diagram of FIG. 1, or preferably within the area bounded by points a, b, c, d and e on the ternary diagram of FIG. 2. The silicoaluminophosphate has a characteristic X-ray powder diffraction pattern (as-synthesized and calcined) which contains at least the d-spacings set forth below in Table III. When SAPO-31 is in the as-synthesized form, "m" preferably has a value of from 0.02 to 0.3.

TABLE III

| 2θ | d | Relative Intensity |
|---|---|---|
| 8.5–8.6 | 10.40–10.28 | m–s |
| 20.2–20.3 | 4.40–4.37 | m |
| 21.9–22.1 | 4.06–4.02 | w–m |
| 22.6–22.7 | 3.93–3.92 | vs |
| 31.7–31.8 | 2.823–2.814 | w–m |

All of the as-synthesized SAPO-31 compositions for which X-ray powder diffraction data have presently been obtained have patterns which are within the generalized pattern of Table IV below.

TABLE IV

| 2θ | d | 100 × I/I₀ |
|---|---|---|
| 6.1 | 14.5 | 0–1 |
| 8.5–8.6* | 10.40–10.28 | 60–72 |
| 9.5* | 9.31 | 7–14 |
| 13.2–13.3* | 6.71–6.66 | 1–4 |
| 14.7–14.8 | 6.03–5.99 | 1–2 |
| 15.7–15.8* | 5.64–5.61 | 1–8 |
| 17.05–17.1 | 5.20–5.19 | 2–4 |
| 18.3–18.4 | 4.85–4.82 | 2–3 |
| 20.2–20.3 | 4.40–4.37 | 44–55 |
| 21.1–21.2* | 4.21–4.19 | 6–28 |
| 21.9–22.1* | 4.06–4.02 | 32–38 |
| 22.6–22.7* | 3.93–3.92 | 100 |
| 23.3–23.35* | 3.818–3.810 | 2–20 |
| 25.1* | 3.548 | 3–4 |
| 25.65–25.75 | 3.473–3.460 | 2–3 |
| 26.5* | 3.363 | 1–4 |
| 27.9–28.0 | 3.198–3.187 | 8–10 |
| 28.7* | 3.110 | 0–2 |
| 29.7 | 3.008 | 4–5 |
| 31.7–31.8 | 2.823–2.814 | 15–18 |
| 32.9–33.0* | 2.722–2.714 | 0–3 |
| 35.1–35.2 | 2.557–2.550 | 5–8 |
| 36.0–36.1 | 2.495–2.488 | 1–2 |
| 37.2 | 2.417 | 1–2 |
| 37.9–38.1* | 2.374–2.362 | 2–4 |
| 39.3 | 2.292 | 2–3 |
| 43.0–43.1* | 2.103–2.100 | 1 |
| 44.8–45.2* | 2.023–2.006 | 1 |
| 46.6 | 1.949 | 1–2 |
| 47.4–47.5 | 1.918 | 1 |
| 48.6–48.7 | 1.872–1.870 | 2 |
| 50.7–50.8 | 1.801–1.797 | 1 |
| 51.6–51.7 | 1.771–1.768 | 2–3 |
| 55.4–55.5 | 1.658–1.656 | 1 |

*Possibly contains peak from a minor impurity.

SAPO-41, an intermediate pore size silicoaluminophosphate molecular sieve, also preferred for use in the process of the invention, comprises a silicoaluminophosphate material having a three-dimensional microporous crystal framework structure of [PO₂], [AlO₂] and [SiO₂] tetrahedral units whose unit empirical formula on an anhydrous basis is:

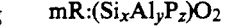

wherein "R" represents at least one inorganic templating agent present in the intracrystalline pore system; "m" represents the moles of "R" present per mole of $(Si_xAl_yP_z)O_2$ and has a value of from zero to 0.3; "x", "y", and "z" represent respectively, the mole fractions of silicon, aluminum and phosphorus, said mole fractions being within the compositional area bounded by points A, B, C, D and E on the ternary diagram of FIG. 1, or preferably within the area bounded by points a, b, c, d and e on the ternary diagram of FIG. 2, said silicoaluminophosphate having a characteristic X-ray powder diffraction pattern (as-synthesized and calcined) which contains at least the d-spacings set forth below in Table V. When SAPO-41 is in the as-synthesized form, "m" preferably has a value of from 0.02 to 0.3.

TABLE V

| 2θ | d | Relative Intensity |
|---|---|---|
| 13.6–13.8 | 6.51–6.42 | w–m |
| 20.5–20.6 | 4.33–4.31 | w–m |
| 21.1–21.3 | 4.21–4.17 | vs |
| 22.1–22.3 | 4.02–3.99 | m–s |
| 22.8–23.0 | 3.90–3.86 | m |
| 23.1–23.4 | 3.82–3.80 | w–m |

TABLE V-continued

| 2Θ | d | Relative Intensity |
|---|---|---|
| 25.5–25.9 | 3.493–3.44 | w-m |

All of the as-synthesized SAPO-41 compositions for which X-ray powder diffraction data have presently been obtained have patterns which are within the generalized pattern of Table VI below.

TABLE VI

| 2Θ | d | $100 \times I/I_o$ |
|---|---|---|
| 6.7–6.8 | 13.19–12.99 | 15–24 |
| 9.6–9.7 | 9.21–9.11 | 12–25 |
| 13.6–13.8 | 6.51–6.42 | 10–28 |
| 18.2–18.3 | 4.87–4.85 | 8–10 |
| 20.5–20.6 | 4.33–4.31 | 10–32 |
| 21.1–21.3 | 4.21–4.17 | 100 |
| 22.1–22.3 | 4.02–3.99 | 45–82 |
| 22.8–23.0 | 3.90–3.87 | 43–58 |
| 23.1–23.4 | 3.82–3.80 | 20–30 |
| 25.2–25.5 | 3.53–3.49 | 8–20 |
| 25.5–25.9 | 3.493–3.44 | 12–28 |
| 29.3–29.5 | 3.048–3.028 | 17–23 |
| 31.4–31.6 | 2.849–2.831 | 5–10 |
| 33.1–33.3 | 2.706–2.690 | 5–7 |
| 37.6–37.9 | 2.392–2.374 | 10–15 |
| 38.1–38.3 | 2.362–2.350 | 7–10 |
| 39.6–39.8 | 2.276–2.265 | 2–5 |
| 42.8–43.0 | 2.113–2.103 | 5–8 |
| 49.0–49.3 | 1.856–1.848 | 1–8 |
| 51.5 | 1.774 | 0–8 |

The above silicoaluminophosphates are generally synthesized by hydrothermal crystallization from a reaction mixture comprising reactive sources of silicon, aluminum and phosphorus, and one or more organic templating agents. Optionally, alkali metal(s) may be present in the reaction mixture. The reaction mixture is placed in a sealed pressure vessel, preferably lined with an inert plastic material, such as polytetrafluoroethylene, and heated, preferably under autogenous pressure at a temperature of at least about 100° C., and preferably between 100° C. and 250° C., until crystals of the silicoaluminophosphate product are obtained, usually for a period of from two hours to two weeks. While not essential to the synthesis of SAPO compositions, it has been found that in general, stirring or other moderate agitation of the reaction mixture and/or seeding of the reaction mixture with seed crystals of either the SAPO to be produced or a topologically similar composition, facilitates the crystallization procedure. The product is recovered by any convenient method such as centrifugation or filtration.

After crystallization the SAPO may be isolated and washed with water and dried in air. As a result of the hydrothermal crystallization, the as-synthesized SAPO contains within its intracrystalline pore system at least one form of the template employed in its formation. Generally, the template is a molecular species, but it is possible, steric considerations permitting, that at least some of the template is present as a charge-balancing cation. Generally, the template is too large to move freely through the intracrystalline pore system of the formed SAPO and may be removed by a post-treatment process, such as by calcining the SAPO at temperatures of between about 200° C. and about 700° C. so as to thermally degrade the template, or by employing some other post-treatment process for removal of at least part of the template from the SAPO. In some instances the pores of the SAPO are sufficiently large to permit transport of the template, and, accordingly, complete or partial removal thereof can be accomplished by conventional desorption procedures such as are carried out in the case of zeolites.

The SAPOs are preferably formed from a reaction mixture having a mole fraction of alkali metal cation that is sufficiently low to not interfere with the formation of the SAPO composition. Although the SAPO compositions will form if alkali metal cations are present, reaction mixtures, having the following bulk composition are preferred:

$$aR_2O(Si_xAl_yP_z)O_2 \, bH_2O$$

wherein "R" is a template; "a" has a value great enough to constitute an effective concentration of "R" and is within the range of from greater than zero to about 3; "b" has a value of from zero to 500; "x", "y" and "z" represent the mole fractions, respectively, of silicon, aluminum and phosphorus wherein x, y and z each have a value of at least 0.01. The reaction mixture is preferably formed by combining at least a portion of the reactive aluminum and phosphorus sources in the substantial absence of the silicon source and thereafter combining the resulting reaction mixture comprising the aluminum and phosphorus sources with the silicon source. When the SAPOs are synthesized by this method the value of "m" is generally above about 0.02.

Though the presence of alkali metal cations are not preferred, when they are present in the reaction mixture, it is preferred to first admix at least a portion of each of the aluminum and phosphorus sources in the substantial absence of the silicon source. This procedure avoids adding the phosphorus source to a highly basic reaction mixture containing the silicon and aluminum source.

The reaction mixture from which these SAPOs are formed contain one or more organic templating agents (templates) which can be most any of those heretofore proposed for use in the synthesis of aluminosilicates. The template preferably contains at least one element of Group VA of the Periodic Table, more preferably nitrogen or phosphorus and most preferably nitrogen. The template contains at least one alkyl, aryl, araalkyl, or alkylaryl group. The template preferably contains from 1 to 8 carbon atoms, although more than eight carbon atoms may be present in the template. Nitrogen-containing templates are preferred, including amines and quaternary ammonium compounds, the latter being represented generally by the formula $R'_4N+$ wherein each $R'$ is an alkyl, aryl, alkylaryl, or araalkyl group; wherein $R'$ preferably contains from 1 to 8 carbon atoms or higher when $R'$ is alkyl and greater than 6 carbon atoms when $R'$ is otherwise. Polymeric quaternary ammonium salts such as $[(C_{14}H_{32}N_2)(OH)_2]_x$ wherein "x" has a value of at least 2 may also be employed. The mono-, di- and tri-amines, including mixed amines, may also be employed as templates either alone or in combination with a quaternary ammonium compound or another template.

Representative templates, phosphorus, aluminum and silicon sources as well as detailed process conditions are more fully described in U.S. Pat. No. 4,440,871, which is incorporated herein by reference.

The process of the invention may also be carried out by using a catalyst comprising an intermediate pore size nonzeolitic molecular sieve containing $AlO_2$ and $PO_2$ tetrahedral oxide units, and at least one Group VIII metal. Exemplary suitable intermediate pore size nonzeolitic molecular sieves are set forth in European Patent Application No. 158,977 which is incorporated herein by reference.

The intermediate pore size molecular sieve is used in admixture with at least one Group VIII metal. Preferably, the Group VIII metal is selected from the group consisting of at least one of platinum and palladium, and optionally, other catalytically active metals such as molybdenum, nickel, vanadium, cobalt, tungsten, zinc, and mixtures thereof. More preferably, the Group VIII metal is selected from the group consisting of at least one of platinum and palladium. The amount of metal ranges from about 0.01% to about 10% by weight of the molecular sieve, preferably from about 0.2% to about 5% by weight of the molecular sieve. The techniques of introducing catalytically active metals into a molecular sieve are disclosed in the literature, and pre-existing metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960; 3,373,109; 4,202,996; 4,440,781 and 4,710,485 which are incorporated herein by reference.

The term "metal" or "active metal" as used herein means one or more metals in the elemental state or in some form such as sulfide, oxide and mixtures thereof. Regardless of the state in which the metallic component actually exists, the concentrations are computed as if they existed in the elemental state.

The physical form of the catalyst depends on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. The catalyst may be employed either as a fluidized catalyst, or in a fixed or moving bed, and in one or more reaction stages.

The intermediate pore size molecular sieve can be manufactured into a wide variety of physical forms. The molecular sieves can be in the form of a powder, a granule, or a molded product, such as an extrudate having a particle size sufficient to pass through a 2-mesh (Tyler) screen and be retained on a 40-mesh (Tyler) screen. In cases wherein the catalyst is molded, such as by extrusion with a binder, the silicoaluminophosphate can be extruded before drying, or dried or partially dried and then extruded.

In a preferred embodiment, the final catalyst will be a composite and includes an intermediate pore size silicoaluminophosphate molecular sieve, a platinum or palladium hydrogenation metal component and an inorganic oxide matrix. The most preferred silicoaluminophosphate is SAPO-11, the most preferred metal component is palladium, and the most preferred support is alumina. A wide variety of procedures can be used to combine the molecular sieve and refractory oxide. For example, the molecular sieve can be mulled with a hydrogel of the oxide followed by partial drying if required and extruding or pelletizing to form particles of a desired shape. Alternatively, the refractory oxide can be precipitated in the presence of the molecular sieve. This is accomplished by increasing the pH of the solution of a refractory oxide precursor such as sodium aluminate or sodium silicate. The combination can then be partially dried as desired, tableted, pelleted, extruded, or formed by other means and then calcined, e.g., at a temperature above 600° F. (316° C.), usually above 800° F. (427° C.). Processes which produce larger pore size supports are preferred to those producing smaller pore size supports when cogelling.

The molecular sieves may be composited with other materials resistant to temperatures and other conditions employed in the process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the hydrocracking process so that products can be obtained economically without employing other means for controlling the rate of reaction. The silicoaluminophosphate molecular sieve may be incorporated into naturally occurring clays, e.g., bentonite and kaolin. These materials, i.e., clays, oxides, etc., function, in part, as binders for the catalyst. It is desirable to provide a catalyst having good crush strength, because in petroleum refining, the catalyst is often subjected to rough handling. This tends to break the catalyst down into powder-like materials which cause problems in processing.

Naturally occurring clays which can be composited with the catalyst include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the molecular sieve can be composited with porous inorganic oxide matrix materials and mixtures of matrix materials such as silica, alumina, titania, magnesia, silica-alumina, silica-magnesia, silica-zirconia, silica-thoria, silica-beryllia, silica-titania, titania-zirconia, as well as ternary compositions such as silica-alumina-thoria, silica-alumina-titania, silica-alumina-magnesia and silica-magnesia-zirconia. The matrix can be in the form of a cogel.

The hydrocracking step of the invention may be conducted by contacting the feed with a fixed stationary bed of catalyst, with a fixed fluidized bed, or with a transport bed. A simple and therefore preferred configuration is a trickle-bed operation in which the feed is allowed to trickle through a stationary fixed bed, preferably in the presence of hydrogen.

The hydrocracking conditions employed depend on the feed used and the desired pour point. Generally, the temperature is from about 260° C. to about 482° C., preferably from about 316° C. to about 482° C. The pressure is typically from about 200 psig to about 3000 psig, preferably from about 500 psig to about 3000 psig. The liquid hourly space velocity (LHSV) is preferably from about 0.05 to about 20, more preferably from about 0.2 to about 10, most preferably from about 0.2 to about 5.

Hydrogen is preferably present in the reaction zone during the hydrocracking process. The hydrogen to feed ratio is typically from about 500 to about 30,000 SCF/bbl (standard cubic feet per barrel), preferably from about 1,000 to about 20,000 SCF/bbl. Generally, hydrogen will be separated from the product and recycled to the reaction zone.

The crystalline catalyst used in the hydrocracking step provides selective conversion of the waxy components to non-waxy components as well as conversion of 700° F. + boiling feed components to middle distillate hydrocarbons. During processing, isomerization of the oil occurs to reduce the pour point of the unconverted 700° F.+ components below that of the feed and form a lube oil which has a low pour point and excellent viscosity index.

Because of the selectivity of the intermediate pore size molecular sieve used in this invention, the yield of product boiling below middle distillate made by cracking is reduced, thereby preserving the economic value of the feedstock.

Process Conditions

Although the catalyst used in this method exhibits excellent stability, activity and midbarrel selectivity, reaction conditions must nevertheless be correlated to provide the desired conversion rates while minimizing conversion to less desired lower-boiling products. The conditions required to meet these objectives will depend on catalyst activity and selectivity and feedstock characteristics such as boiling range, as well as organonitrogen and aromatic content and structure. The conditions will also depend on the most judicious compromise of overall activity, i.e., conversion and selectivity. For example, these systems can be operated at relatively high conversion rates on the order of 70, 80 or even 90% conversion. However, higher conversion rates generally result in lower selectivity. Thus, a compromise must be drawn between conversion and selectivity. The balancing of reaction conditions to achieve the desired objectives is part of the ordinary skill of the art.

The overall conversion rate is primarily controlled by reaction temperature and liquid hourly space velocity. However, selectivity is generally inversely proportional to reaction temperature. It is not as severely affected by reduced space velocities at otherwise constant conversion. Conversely, selectivity for pour point reduction of lube oil is usually improved at lower pressures. Thus, the most desirable conditions for the conversion of a specific feed to a predetermined product can be best obtained by converting the feed at several different temperatures, pressures, space velocities and hydrogen addition rates, correlating the effect of each of these variables and selecting the best compromise of overall conversion and selectivity.

The conditions should be chosen so that the overall conversion rate will correspond to the production of at least about 40%, preferably at least about 50%, of the products boiling below from about 675° F. (343° C.) to about 725° F. (385° C.) in the middle distillate range. Midbarrel selectivity should be such that at least about 40%, preferably at least about 50% of the product is in the middle distillate range, preferably below from about 675° F. to about 725° F. and above about 300° F. The process can maintain conversion levels in excess of about 50% at selectivities in excess of 60% to middle distillate products boiling between 300° F. (149° C.) and about 675° F. (343° C.) to about 725° F. (385° C.). Preferably, the hydrocarbonaceous effluent contains greater than about 40% by volume boiling above about 300° F. and below from about 675° F. to about 725° F. and has a pour point below about 0° F., more preferably below about -20° F. The lube oil produced by the process of the invention has a low pour point, for example, below about 30° F., and a high viscosity index, for example, from about 95 to about 150. In another embodiment, the pour point of the lube oil is from about 30° F. to about −70° F.

The process can be operated as a single-stage hydroprocessing zone. It can also be the second stage of a two-stage hydrocracking scheme in which the first stage removes nitrogen and sulfur from the feedstock before contact with the middle distillate-producing catalyst.

Nitrogen Content of Feedstocks

While the process herein can be practiced with utility when the feed contains organic nitrogen (nitrogen-containing impurities), for example as much as several thousand parts per million by weight of organic nitrogen, it is preferred that the organic nitrogen content of the feed be less than 50 ppmw, more preferably less than 10 ppmw. Particularly good results, in terms of activity and length of catalyst cycle (period between successive regenerations or start-up and first regeneration), are I0 obtained when the feed contains less than !0 ppmw of organic nitrogen. This is surprising in view of the art (see, for example, U.S. Pat. No. 3,894,938).

Sulfur Content Feedstocks

The presence of organic sulfur (sulfur-containing impurities) in the feedstock does not appear to deleteriously affect the desired hydrocracking of the feed, for example, in terms of activity and catalyst life. In fact, hydrodesulfurization of the feed of organic sulfur is in large part a significant concurrent reaction. However, the resulting product will usually contain at least some thiols and/or thioethers as a result of inter-reaction of hydrogen sulfide and olefinic hydrocarbons in the effluent product stream. Thus, it may be desirable in some instances that the feed prior to use in the process herein by hydrofined or hydrotreated for at least substantial removal of both organic sulfur- and nitrogen-containing compounds.

Upstream hydrodenitrogenation can be performed in the reactor with the molecular sieve-containing catalyst or preferably in a separate reactor. When a separate hydrodenitrogenation reactor is used, it may be desirable to remove, e.g., flash, light gaseous products such as NH3 upstream of the reactor containing the molecular sieve-containing catalyst. If the hydrotreating is performed in the same reactor, the molecular sieve-containing catalyst is disposed in one or more layers downstream of an active hydrodenitrogenation catalyst. The single reactor should preferably be operated under hydrotreating conditions sufficient to reduce the organic nitrogen of the feed to 10 ppmw or less before the feed encounters the molecular sieve-containing layer. The volume of hydrodenitrogenation catalyst relative to molecular sieve-containing catalyst can vary over a wide range, such as from about 0.1 to 1 to 20 to 1, preferably at least 0.2 to 1 and more preferably at least 0.5 to 1. The ratio depends upon such parameters as: (a) the organic nitrogen content of the feedstock; (b) the hydrodenitrogenation and hydrocracking activities of the upstream hydrotreating catalyst; and (c) the degree of overall hydrocracking desired.

The upstream hydrotreating catalysts can be any of the conventional catalysts having hydrodenitrogenation and hydrocracking activity. See, for example, U.S. Pat. No. 3,401,125 incorporated herein by reference. In general, such hydrotreating catalysts are porous composites or inorganic matrix oxides such as alumina, silica, and magnesia, which contain one or more hydrogenation components such as transition elements, particularly elements of Group VIB or Group VIII of the Periodic Table of the Elements. *Handbook of Chemistry and Physics*, 45th Ed., Chemical Rubber Company. The Group VIB and/or Group VIII or other transition elements can be present as metals, oxides, or sulfides. The hydrotreating catalyst can also contain promoters such as phosphorus, titanium and other materials known in the art, present as metals, oxides or sulfides. The upstream hydrotreating catalyst need not contain a silicoaluminophosphate component. Typical upstream hydrogenation catalysts suitable for use herein contain 10 to 30 wt.% amorphous silica, 20 to 40 wt.% amorphous alumina, 15 to 30 wt.% Group VIB metal oxide, such as $WO_3$, 5 to 15 wt.% Group VIII metal oxide, such as NiO and 2 to 15 wt.% of a promoter oxide, such as $TiO_2$. The hydrotreating catalyst should have an average pore size in the range of about 30 to 200 Angstroms and a surface area of at least about 150 square meters per gram.

Following the hydrocracking step over the silicoaluminophosphate catalyst, the middle distillate and lighter boiling products are separated from the lube oil base stock by distillation. It is often desirable to then treat this base stock by mild hydrogenation referred to as hydrofinishing to improve color and produce a more stable oil. Hydrofinishing is typically conducted at temperatures ranging from about 190° C. to about 340° C., at pressures from about 400 psig to about 3000 psig, at space velocities (LHSV) from about 0.1 to about 20, and hydrogen recycle rates of from about 400 to about 15,000 SCF/bbl. The hydrogenation catalyst employed must be active enough not only to hydrogenate the olefins, diolefins and color bodies within the lube oil fractions, but also to reduce the aromatic content. The hydrofinishing step is beneficial in preparing an acceptably stable lubricating oil.

Suitable hydrogenation catalysts include conventional metallic hydrogenation catalysts, particularly the Group VIII metals such as cobalt, nickel, palladium and platinum. The metals are typically associated with carriers such as bauxite, alumina, silica gel, silica-alumina composites, and crystalline aluminosilicate zeolites. Palladium is a particularly preferred hydrogenation metal. If desired, non-noble Group VIII metals can be used with molybdates. Metal oxides or sulfides can be used. Suitable catalysts are disclosed in U.S. Pat. Nos. 3,852,207; 4,157,294; 3,904,513 and 4,673,487, which are incorporated herein by reference.

The high viscosity index lube oil produced by the process of the present invention can be used as a blending component to raise the viscosity index of lube oils to a higher value. The lube oil is particularly suitable for use as a blending component when the lube oil has a high viscosity index, for example, greater than 130. Since yield decreases with increasing viscosity index in either hydrocracking or solvent refining, the use of an ultra-high viscosity oil to increase the viscosity index improves yield.

The invention will be further clarified by the following examples, which are intended to be purely exemplary of the invention.

EXAMPLE 1

SAPO-11 was prepared as described below and identified as such by x-ray diffraction analysis. More specifically, 115.6 g of 85% $H_3PO_4$ were added to 59 g of $H_2O$ and cooled in an ice bath. To this were slowly added 204.2 g of aluminum isopropoxide ($[(CH_3)_2CHO]_3Al$) and mixed until homogeneous. 120 g of $H_2O$ were added to 30 g of Cab-O-Sil M-5 silica and the mixture added to the above with mixing until homogeneous. 45.6 g of di-n-propylamine were then slowly added with mixing, again until homogeneous. Synthesis was carried out in a Teflon bottle in an autoclave at 200° C. for 5 days.

The anhydrous molar composition of the calcined sieve was 0.4 $SiO_2$:$Al_2O_3$:$P_2O_5$ The sieve was bound with 35% Catapal alumina and made into 1/10-inch extrudate. The extrudate was dried in air for 4 hours at 250° F., then calcined 2 hours at 450° F. and 2 hours at 1000° F. The extrudate was then impregnated by the pore-fill method with 0.5 wt.% Pd using an aqueous solution of $Pd(NH_3)_4(NO_3)_2$. The catalyst was dried for 2 hours at 250° F., then calcined in air for two hours at 450° F. and two hours at 900° F. It was then crushed to 24–42 mesh.

EXAMPLE 2

The catalyst of Example 1 was used to hydrocrack a hydrodenitrified vacuum gas oil (Table VII) at 700° F., 2200 psig, 1.3 LHSV, and 8M SCF/bbl once-through $H_2$ at a conversion below 725° F. of 60 wt.%, where percent conversion is defined as $$\frac{\text{wt. \% 725° F. + (feed)} - \text{wt. \% 725° F. + (product)}}{\text{wt. \% 725° F. + (feed)}} \times 100$$

Inspections of the 725° F.- products are given in Table VIII. Inspections of the 725° F.+ products are given in Table IX, showing this oil to have both very high VI and very low pour point.

TABLE VII

| Hydrodenitrified Vacuum Gas Oil | |
|---|---|
| Gravity, °API | 38.2 |
| Aniline Point, °F. | 246.4 |
| Sulfur, ppm | 1.0 |
| Nitrogen, ppm | 1.8 |
| Pour Point, °F. | +125 |
| Distillation, ASTM D1160, °F. | |
| ST/5 | 688/732 |
| 10/30 | 751/782 |
| 50 | 815 |
| 70/90 | 856/928 |
| 95/EP | 966/1024 |

TABLE VIII

| Inspections of 725° F. − Product from Hydrocracking Hydrodenitrified Vacuum Gas Oil over Pd/SAPO-11 at 700° F., 2200 psig, 1.3 LHSV, and 8M SCF/bbl $H_2$ | |
|---|---|
| Conversion <725° F., Wt. % | 60 |
| Product Selectivity, Wt. % | |
| C4- | 10.6 |
| C5-230° F. | 14.0 |

TABLE VIII-continued

Inspections of 725° F. − Product from Hydrocracking Hydrodenitrified Vacuum Gas Oil over Pd/SAPO-11 at 700° F., 2200 psig, 1.3 LHSV, and 8M SCF/bbl $H_2$

| | |
|---|---|
| 230–284° F. | 6.2 |
| 284–482° F. | 22.4 |
| 482–725° F. | 46.8 |
| 482–725° F. | |
| Pour Point, °F. | −55 |
| Distillation, D86, LV %, °F. | |
| ST/10 | 467/522 |
| 30/50 | 572/618 |
| 70/90 | 646/673 |
| EP | 712 |

TABLE IX

Inspections of 725° F. + Product from Hydrocracking Hydrodenitrified Vacuum Gas Oil over Pd/SAPO-11 at 700° F., 2200 psig, 1.3 LHSV, 8M SCF/bbl $H_2$ and 60% Conversion <725° F.

| | |
|---|---|
| Pour Point, °F. | −30 |
| Cloud Point, °F. | 0 |
| Viscosity, St, 40° C. | 25.76 |
| 100° C. | 5.172 |
| VI | 135 |
| Simulated Distillation, LV %, °F. | |
| ST/5 | 718/733 |
| 10/30 | 745/784 |
| 50 | 822 |
| 70/90 | 872/963 |
| 95/99 | 1007/1085 |

EXAMPLE 3

A. Comparative Example

The hydrodenitrified vacuum gas oil of Table VII was hydrocracked over a sulfided cogelled nickel-tungsten-silica-alumina catalyst containing 7.7 wt.% Ni and 19.4 wt.% W. The conditions were a catalyst temperature of 670° F., a reactor pressure of 2200 psig, a liquid hourly space velocity (LHSV) of 1.3, and a once-through hydrogen rate of 8 MSCF/bbl. The conversion below 700° F. was 56 wt.%, where percent conversion is defined as $$\frac{\text{Wt. \% 700° F. + (feed)} - \text{Wt. \% 700° F. + (product)}}{\text{Wt. \% 700° F. + (feed)}} \times 100$$

The liquid product was distilled into fractions boiling in the following ranges: $C_5$–230° F., 230–284° F., 284–482° F., 482–698° F., and 698° F.+, where the middle distillate fractions are those with the ranges 284–482° F. and 482–698° F. The yields of the 698° F.-fractions are shown in FIG. 3, which shows a diesel (482–698° F.) yield of 36 wt.%. The inspections of the diesel cut are given in Table X below, showing a pour point of +5° F.

B. SAPO-11 was prepared as described below and identified as such by X-ray diffraction analysis. More specifically, 115.6 g of 85% $H_3PO_4$ were added to 59 g of $H_2O$. To this were slowly added 204.2 g of aluminum isopropoxide ($[(CH_3)_2CHO]_3Al$) and mixed until homogeneous. 8 g of $H_2O$ were added to 60.2 g of Ludox AS-30 (30% silica aqueous sol) and the mixture slowly added to the above with mixing until homogeneous. 45.6 g of di-n-propylamine were then slowly added with mixing, again until homogeneous. Synthesis was carried out in a Teflon bottle in an autoclave at 150° C. for 5 days.

The anhydrous molar composition of the calcined sieve was $$0.2SiO_2:Al_2O_3:P_2O_5$$

The sieve was bound with 35% catapal alumina and made into 1/10-inch extrudate. The extrudate was dried in air for 4 hours at 250° F., then calcined 2 hours at 450° F. and 2 hours at 1000° F. The extrudate was then impregnated by the pore-fill method with 0.5 wt.% Pd using an aqueous solution of $Pd(NH_3)_4(NO3)_2$. The catalyst was dried for 2 hours at 250° F., then calcined in air for two hours at 450° F. and two hours at 900° F. It was then crushed to 24–42 mesh and used to hydrocrack the feed of the above example at 750° F., 2200 psig, 1.0 LHSV, and 8M SCF/bbl once-through $H_2$ to give 44 wt.% conversion below 700° F. Product yields are compared to those for the Comparative Example catalyst in FIG. 3 showing the 482–698° F. diesel yield to be 7 wt.% higher. The inspections of the diesel cut are given in Table X below showing a pour point of −40° F.

C. The catalyst of Example B was also run at 750° F., 1.3 LHSV, 2200 psig, and 8M SCF/bbl once-through $H_2$ to give 47 wt.% conversion below 725° F. The diesel end point was extended from 698° F. to 725° F., thereby increasing diesel yield another 11 wt.%. Despite the higher end point, the pour point was still exceedingly low (-50° F.). The inspections of the diesel cut are given in Table X below.

TABLE X

Diesel Cut from Hydrocracking Hydrodenitrified Vacuum Gas Oil

| Catalyst | Ni—W/$SiO_2$—$Al_2O_3$ | Pd/SAPO-11 | Pd/SAPO-11 |
|---|---|---|---|
| Conversion, Wt. % | 56<700° F. | 44<700° F. | 47<725° F. |
| Selectivity, Wt. % | 35.8 | 42.5 | 53.4 |
| Selectivity to Total Middle Distillate, Wt. % | 64.7 | 75.4 | 77.3 |
| Pour Point, °F. | +5 | −40 | −50 |
| Cloud Point, °F. | +34 | −20 | −14 |
| Calculated Cetane Index | 81.7 | 78.7 | 78.3 |
| Distillation, D86, LV %, °F. | | | |
| ST/10 | 474/508 | 480/510 | 481/526 |
| 30/50 | 541/576 | 540/572 | 578/623 |
| 70/90 | 612/645 | 604/640 | 647/666 |
| EP | 691 | 690 | 693 |

EXAMPLE 4

SAPO-5 was grown according to U.S. Pat. No. 4,440,871 and identified as such by X-ray diffraction analysis. The anhydrous molar composition of the calcined sieve was $$0.1SiO_2:Al_2O_3:P_2O_5$$

The sieve was extruded with 35% Catapal alumina, impregnated with 0.5 wt.% Pd, and calcined in the same manner as the catalyst of Example 3B. This catalyst was then used to hydrocrack the same vacuum gas oil at 1.3 LHSV, 2200 psig, and 8M SCF/bbl once-through $H_2$. At 775° F., the conversion below 725° F. was 51 wt.%. The product yields are given in Table XI. The pour point of the 482–725° F. diesel cut was +48° F.

TABLE XI

Diesel Cut from Hydrocracking Hydrodenitrified Vacuum Gas Oil over Pd/SAPO-5 at 51% <725° F.

| | |
|---|---|
| Selectivity, Wt. % | 47.0 |
| Pour Point, °F. | +48 |
| Cloud Point, °F. | +61 |
| Calculated Cetane Index | 83.1 |
| Distillation, D86, LV %, °F. | |
| ST/10 | 486/523 |
| 30/50 | 570/617 |
| 70/90 | 645/669 |
| EP | 713 |

EXAMPLE 5

To further show the uniqueness of SAPO-11 in hydrocracking for low pour middle distillates, the following two catalysts were tested for dewaxing a + 100° F. pour point lube oil (Table XII) to +30° F. pour point at 1 LHSV, 2200 psig, and 8M SCF/bbl $H_2$.

EXAMPLE 5

(a) 0.8 wt. % Pt impregnated on HZSM-5 bound with 35% Catapal alumina.

(b) 1.0 wt. % Pt impregnated on SAPO-11 bound with 35% Catapal alumina.

FIG. 4 shows that while ZSM-5 catalyst dewaxed the feed, it produced essentially no 350-800° F. liquid, making mostly $C_3$-350° F. The SAPO-11 catalyst, on the other hand, produced mainly liquid boiling in the 350-800° F. range.

TABLE XII

+100° F. Pour Point Lube Oil

| | |
|---|---|
| Gravity, °API | 34.0 |
| Aniline Point, °F. | 244.0 |
| Sulfur, ppm | 0.4 |
| Nitrogen, ppm | 0.1 |
| Pour Point, °F. | +100 |
| Viscosity, cS, 100° C. | 6.195 |
| Flash Point, °F. | 420 |
| P/N/A/S, LV % | 25.0/62.1/12.8/0 |
| Simulated Distillation, LV %, °F. | |
| ST/5 | 313/770 |
| 10/30 | 794/841 |
| 50 | 873 |
| 70/90 | 908/968 |
| 95/EP | 998/1061 |

What is claimed is:

1. A process for preparing low pour middle distillate hydrocarbons and lube oil comprising:
   (a) contacting under hydrocracking conditions a hydrocarbonaceous feed wherein at least about 90% of said feed has a boiling point greater than about 600° F., with a catalyst comprising an intermediate pore size silicoaluminophosphate molecular sieve and at least one hydrogenation component,
   (b) recovering a hydrocarbonaceous effluent wherein greater than 40% by volume of said effluent (i) boils above about 300° F. and below about 725° F. and (ii) has a pour point below about 0° F.; and
   (c) distilling the hydrocarbonaceous effluent to produce a first fraction containing middle distillate products having a boiling point below about 725° F., and a second fraction containing a lube oil having a boiling above about 700° F. and having a pour point of less than about 30° F.

2. The process of claim 1 wherein said hydrocarbonaceous feed has a paraffin content of at least about 20% by weight.

3. The process of claim 1 wherein said intermediate pore size silicoaluminophosphate molecular sieve is selected from the group consisting of SAPO-11, SAPO-31 and SAPO-41.

4. The process of claim 1 wherein said hydrogenation component is selected from the group consisting of at least one of platinum, palladium, molybdenum, nickel, vanadium, cobalt, tungsten and zinc.

5. The process of claim 4 wherein said hydrogenation component is selected from the group consisting of platinum and palladium.

6. The process of claim 1 wherein said hydrogenation component is present in an amount of from about 0.01% to 10% based on the weight of molecular sieve.

7. The process of claim 1 wherein said catalyst further comprises an inorganic oxide matrix.

8. The process of claim 7 wherein said matrix is alumina.

9. The process of claim 1 wherein said feed is a gas oil.

10. The process of claim 1 wherein said feed has a content of nitrogen-containing impurities, calculated as nitrogen, which is below about 50 ppmw.

11. The process of claim 1 wherein said feed has a content of nitrogen-containing impurities, calculated as nitrogen, which is below about 10 ppmw.

12. The process of claim 1 wherein said hydrocarbon feed is selected from the group consisting of petroleum distillates, solvent deasphalted residua, and shale oils.

13. The process of claim 1 wherein greater than 50% by weight of converted product boils above about 300°0 F. and below about 725° F.

14. The process of claim 1 wherein said catalyst is disposed downstream of a reaction zone in which a hydrocarbon feed is contacted under hydroprocessing conditions with an active hydrodenitrogenation catalyst.

15. The process of claim 14 wherein said hydrodenitrogenation catalyst is disposed in a single reactor with said catalyst.

16. The process of claim 1 wherein said process is carried out at a temperature of from about 260° to about 482° C., a pressure of from about 200 psig to about 3000 psig, a liquid hourly space velocity of from about 0.05 $hr^{-1}$ to about 20 $hr^{-1}$, and a hydrogen circulation rate of from about 500 to about 30,000 SCF/bbl.

17. The process of claim 1 further comprising hydrofinishing said lube oil.

18. The process of claim 17 wherein hydrofinishing is carried out at a temperature of from about 190° C. to about 340° C. and pressure of from about 400 psig to about 3000 psig.

19. The process of claim 17 wherein hydrofinishing is carried out in the presence of a metallic hydrogenation catalyst.

20. A process for preparing low pour middle distillate hydrocarbons and lube oil comprising:
   (a) contacting under hydrocracking conditions a hydrocarbonaceous feed wherein at least about 90% of said feed has a boiling point greater than about 600° F., with a catalyst comprising an intermediate pore size nonzeolitic molecular sieve containing $AlO_2$ and $PO_2$ tetrahedral oxide units, and at least one Group VIII metal.

(b) recovering a hydrocarbonaceous effluent wherein greater than about 40% by volume of said effluent (i) boils above about 300° F. and below about 725° F. and (ii) has a pour point of below about 0° F.; and (c) distilling the hydrocarbonaceous effluent to produce a first fraction containing middle distillate products having a boiling point below about 725° F., and a second fraction containing a lube oil having a boiling point above about 700° F. and having a pour point of less than about 30° F.

21. The process of claim 20 wherein said feed has a content of nitrogen-containing impurities, calculated as nitrogen, which is below about 50 ppmw.

22. The process of claim 20 wherein said feed has a content of nitrogen-containing impurities, calculated as nitrogen, which is below about 10 ppmw.

23. The process of claim 20 wherein said hydrocarbon feed is selected from the group consisting of petroleum distillates, solvent deasphalted residua, and shale oils.

24. The process of claim 20 wherein greater than 50% by weight of converted product boils above about 300° F. and below about 725° F.

25. The process of claim 20 wherein said catalyst is disposed downstream of a reaction zone in which a hydrocarbon feed is contacted under hydroprocessing conditions with an active hydrodenitrogenation catalyst.

26. The process of claim 25 wherein said hydrodenitrogenation catalyst is disposed in a single reactor with said catalyst.

27. The process of claim 20 wherein said process is carried out at a temperature of from about 260° to about 482° C., a pressure of from about 200 psig to about 3000 psig, a liquid hourly space velocity of from about $0.05 \text{ hr}^{-1}$ to about $20 \text{ hr}^{-1}$, and a hydrogen circulation rate of from about 500 to about 30,000 SCF/bbl.

28. The process of claim 20 further comprising hydrofinishing said lube oil.

* * * * *